(12) United States Patent
Sato et al.

(10) Patent No.: US 11,858,505 B2
(45) Date of Patent: Jan. 2, 2024

(54) VEHICLE AND CONTROL APPARATUS THEREOF

(71) Applicant: HONDA MOTOR CO., LTD., Tokyo (JP)

(72) Inventors: Shinya Sato, Wako (JP); Hiroyuki Koibuchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 318 days.

(21) Appl. No.: 17/177,325

(22) Filed: Feb. 17, 2021

(65) Prior Publication Data

US 2021/0300355 A1 Sep. 30, 2021

(30) Foreign Application Priority Data

Mar. 25, 2020 (JP) ................................. 2020-054884

(51) Int. Cl.
*B60W 30/095* (2012.01)
*B60W 30/09* (2012.01)
*B60W 30/06* (2006.01)

(52) U.S. Cl.
CPC ........ *B60W 30/0953* (2013.01); *B60W 30/06* (2013.01); *B60W 30/09* (2013.01);
(Continued)

(58) Field of Classification Search
CPC .. B60W 30/0953; B60W 30/06; B60W 30/09; B60W 2420/42; B60W 2554/20;
(Continued)

(56) References Cited

U.S. PATENT DOCUMENTS 9,511,800 B2 * 12/2016 Lee ........................ B62D 5/046
9,731,716 B2    8/2017 Ohsugi et al.
(Continued)

FOREIGN PATENT DOCUMENTS

CN    105722570 A    6/2016
GB       2568879 A *  6/2019 ............ B60W 30/06
(Continued)

OTHER PUBLICATIONS

Chinese Office Action for Chinese Patent Application No. 202110214088.7 dated Jul. 4, 2023. (partially translated).

*Primary Examiner* — Michael A Berns
(74) *Attorney, Agent, or Firm* — Thomas | Horstemeyer, LLP

(57) ABSTRACT

A control apparatus of a vehicle included a parking determination unit configured to determine whether the vehicle is about to be parked in a parking space, and a collision avoidance unit configured to be able to execute an avoidance function for avoiding collision with an object that is moving in a direction intersecting a longer direction of the vehicle. While the vehicle is about to be parked in the parking space, in a case where an angle between the longer direction of the vehicle and a longer direction of the parking space is larger than a threshold value, the collision avoidance unit inactivates the avoidance function, and in a case where the angle between the longer direction of the vehicle and the longer direction of the parking space is smaller than the threshold value, the collision avoidance unit activates the avoidance function.

4 Claims, 4 Drawing Sheets

(52) U.S. Cl.
CPC ..... *B60W 2420/42* (2013.01); *B60W 2554/20* (2020.02); *B60W 2554/801* (2020.02)

(58) Field of Classification Search
CPC ....... B60W 2554/801; B60W 2554/80; B60W 2554/805; B60W 30/08
See application file for complete search history.

(56) References Cited

U.S. PATENT DOCUMENTS

| | | | |
|---|---|---|---|
| 9,862,416 | B2 | 1/2018 | Imai et al. |
| 10,179,590 | B2* | 1/2019 | Lavoie ............ B60W 30/18027 |
| 10,846,949 | B2* | 11/2020 | Seo ........................ G01S 13/931 |
| 11,597,362 | B2* | 3/2023 | Sato ...................... B60W 30/09 |
| 2015/0151789 | A1 | 6/2015 | Lee et al. |
| 2016/0264133 | A1 | 9/2016 | Ohsugi et al. |
| 2016/0272244 | A1* | 9/2016 | Imai .................. B62D 15/0285 |
| 2017/0072947 | A1* | 3/2017 | Lavoie ............ B60W 30/18027 |
| 2020/0074759 | A1* | 3/2020 | Seo ........................ G07C 5/008 |
| 2021/0300345 | A1* | 9/2021 | Sato ...................... G08G 1/167 |
| 2021/0300355 | A1* | 9/2021 | Sato ...................... B60W 30/09 |

FOREIGN PATENT DOCUMENTS

| | | | |
|---|---|---|---|
| JP | 2015081022 A | | 4/2015 |
| JP | 2016120914 A | | 7/2016 |
| WO | 2019105665 A1 | | 6/2019 |

\* cited by examiner

VEHICLE AND CONTROL APPARATUS THEREOF

CROSS-REFERENCE TO RELATED APPLICATION(S)

This application claims priority to and the benefit of Japanese Patent Application No. 2020-054884 filed on Mar. 25, 2020, the entire disclosure of which is incorporated herein by reference.

BACKGROUND OF THE INVENTION

Field of the Invention

The present disclosure relates to a vehicle and a control apparatus thereof.

Description of the Related Art

Functions for monitoring the situation surrounding a vehicle and performing an operation for avoiding collision with another vehicle or a person have been in practical use. Japanese Patent Laid-Open No. 2015-081022 describes executing this function when a vehicle is parked.

A vehicle moves at a lower speed in a parking lot, and thus there is a trend in which a larger number of vehicles and pedestrians are moving in the surroundings of the vehicle. Therefore, the processing load for performing the above-described avoidance operation is large. In addition, in movement for parking, a turning radius of a vehicle is small, and thus there are cases where the accuracy for detecting an object in the surroundings decreases.

SUMMARY OF THE INVENTION

One aspect of the present disclosure provides a technique for executing a collision avoidance function in appropriate cases. According to an embodiment of the disclosure, a control apparatus of a vehicle included a parking determination unit configured to determine whether or not the vehicle is about to be parked in a parking space, and a collision avoidance unit configured to be able to execute an avoidance function for avoiding collision with an object that is moving in a direction intersecting a longer direction of the vehicle. While the vehicle is about to be parked in the parking space, in a case where an angle between the longer direction of the vehicle and a longer direction of the parking space is larger than a threshold value, the collision avoidance unit inactivates the avoidance function, and in a case where the angle between the longer direction of the vehicle and the longer direction of the parking space is smaller than the threshold value, the collision avoidance unit activates the avoidance function.

DESCRIPTION OF THE EMBODIMENTS

Figure 1:
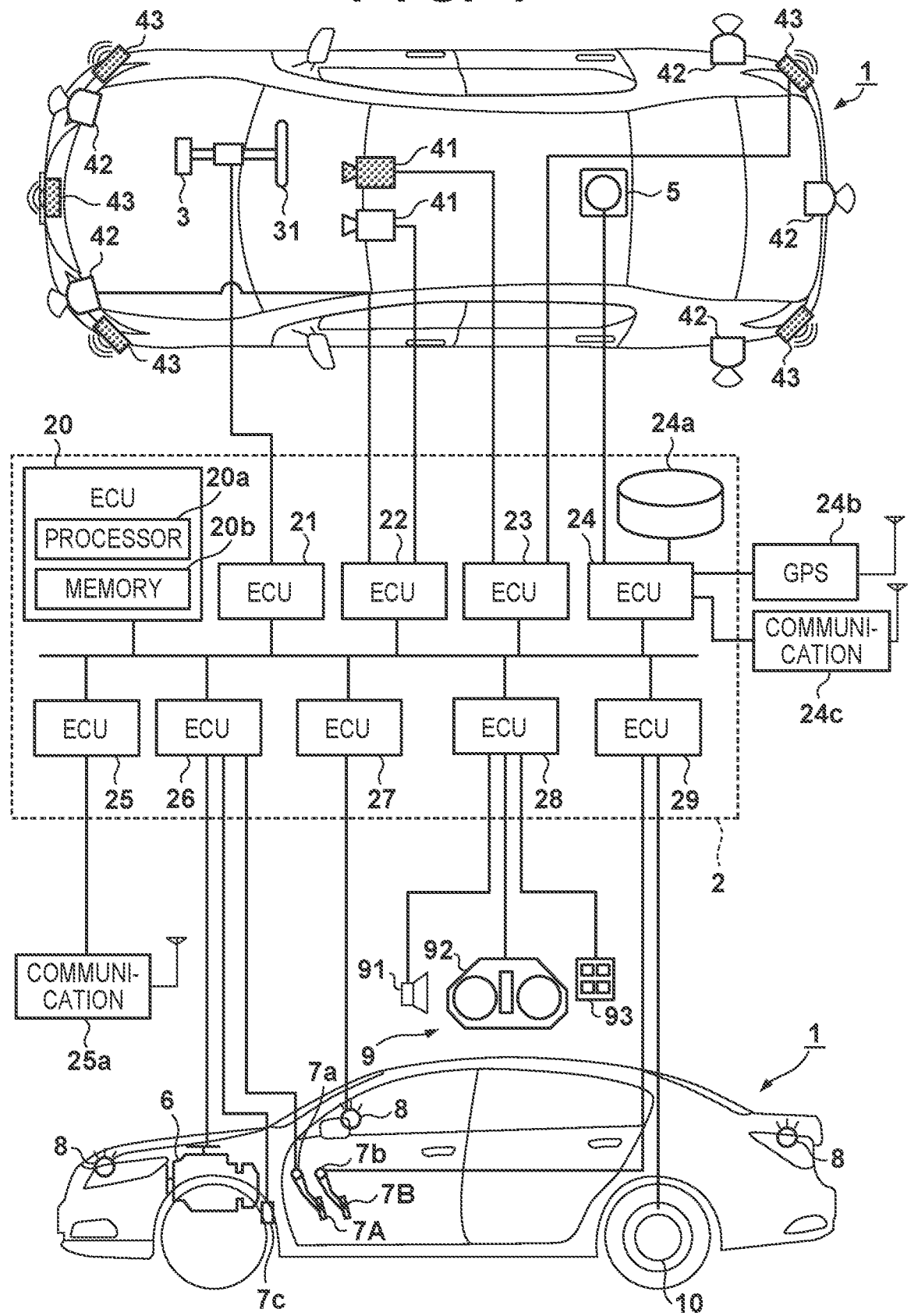
FIG. 1 is a block diagram illustrating a configuration example of a vehicle according to an embodiment of the present disclosure.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

Hereinafter, embodiments of the present invention will be described with reference to the attached drawings. In various embodiments, the same reference numerals are given to the same configurations, and redundant description thereof is omitted. In addition, the embodiments can be changed and combined as appropriate.

FIG. 1 is a block diagram of a vehicle 1 according to an embodiment of the present disclosure. FIG. 1 schematically shows the vehicle 1 in a plan view and a side view. The vehicle 1 is a sedan-type four-wheel passenger car, for example. The vehicle 1 may be such a four-wheel vehicle, or may also be a two-wheeler or another type of vehicle.

The vehicle 1 includes a vehicle control apparatus 2 (hereinafter, simply referred to as "control apparatus 2") that controls the vehicle 1. The control apparatus 2 includes a plurality of ECUs 20 to 29 communicably connected by an in-vehicle network. Each of the ECUs includes a processor represented by a CPU, a memory such as a semiconductor memory, an interface to an external device, and the like. The memory stores programs that are executed by the processor, data that is used for processing by the processor, and the like. Each ECU may also include a plurality of processors, a plurality of memories, a plurality of interfaces, and the like. For example, the ECU 20 includes a processor 20a and a memory 20b. As a result of the processor 20a executing an instruction included in a program stored in the memory 20b, processing of the ECU 20 is executed. In place of this, the ECU 20 may also include a dedicated integrated circuit for executing the processing of the ECU 20 such as an ASIC. The same applies to other ECUs.

Functions respectively assigned to the ECUs 20 to 29, and the like will be described below. Note that the number of ECUs and the assigned functions can be designed as appropriate, and they can be broken into smaller pieces than this embodiment, or can be integrated.

The ECU 20 executes control related to automated travelling of the vehicle 1. In automated driving, at least one of steering and acceleration/deceleration of the vehicle 1 is automatically controlled. Automated travelling that is performed by the ECU 20 may include automated travelling (may also be referred to as "automated driving") that does not require a driver's travelling operation and automated travelling (may also be referred to as "driving assist") for assisting a driver's travelling operation.

The ECU 21 controls an electronic power steering apparatus 3. The electronic power steering apparatus 3 includes a mechanism for steering front wheels according to a driver's driving operation (steering operation) on a steering wheel 31. The electronic power steering apparatus 3 also includes a motor that exerts drive force for assisting a steering operation or automatically steering the front wheels, a sensor that detects a steering angle, and the like. When the driving state of the vehicle 1 is an automated driving state, the ECU 21 automatically controls the electronic power steering apparatus 3 according to an instruction from the ECU 20, and controls the direction of forward movement of the vehicle 1.

The ECUs 22 and 23 control detection units 41 to 43 that detect the situation surrounding the vehicle, and perform information processing on their detection results. Each detection unit 41 is a camera for shooting an image ahead of the vehicle 1 (which may hereinafter be referred to as "camera 41"), and, in this embodiment, is installed at a roof front part on an interior side of the front window of the vehicle 1. By analyzing an image shot by a camera 41, it is possible to extract the contour of a target object and a demarcation line (white line, for example) of a traffic lane on a road.

Each detection unit 42 is a LIDAR (Light Detection and Ranging, may hereinafter be referred to as "LIDAR 42"), detects a target object in the surroundings of the vehicle 1, and measures the distance from the target object. In this embodiment, five LIDARs 42 are provided, two of the five LIDARs 42 being provided at the respective front corners of the vehicle 1, one at the rear center, and two on the respective sides at the rear. Each detection unit 43 is a millimeter-wave radar (which may hereinafter be referred to as "radar 43"), detects a target object in the surroundings of the vehicle 1, and measures the distance from the target object. In this embodiment, five radars 43 are provided, one of the radars 43 being provided at the front center of the vehicle 1, two at the respective front corners, and two at the rear corners.

The ECU 22 controls one camera 41 and the LIDARs 42, and performs information processing on their detection results. The ECU 23 controls the other camera 41 and the radars 43, and performs information processing on their detection results. By providing two sets of apparatuses that detect the surrounding situation of the vehicle, the reliability of detection results can be improved, and by providing detection units of different types such as cameras, LIDARs, radars, and sonars, the surrounding environment of the vehicle can be multilaterally analyzed.

The ECU 24 controls a gyro sensor 5, a GPS sensor 24*b*, and a communication apparatus 24*c*, and performs information processing on their detection results or communication results. The gyro sensor 5 detects rotary movement of the vehicle 1. A course of the vehicle 1 can be determined based on a detection result of the gyro sensor 5, a wheel speed, and the like. The GPS sensor 24*b* detects the current position of the vehicle 1. The communication apparatus 24*c* wirelessly communicates with a server that provides map information and traffic information, and acquires such information. The ECU 24 can access a database 24*a* of map information built in a memory, and the ECU 24 searches for a route from the current location to a destination, and the like. The ECU 24, the map database 24*a*, and the GPS sensor 24*b* constitute a so-called navigation apparatus.

The ECU 25 includes a communication apparatus 25*a* for inter-vehicle communication. The communication apparatus 25*a* wirelessly communicates with another vehicle in the surroundings thereof, and exchanges information with the vehicle.

The ECU 26 controls a power plant 6. The power plant 6 is a mechanism for outputting drive force for rotating the drive wheels of the vehicle 1, and includes an engine and a transmission, for example. For example, the ECU 26 controls output of the engine in accordance with a driver's driving operation (an accelerator operation or an accelerating operation) detected by an operation detection sensor 7*a* provided on an accelerator pedal 7A, and switches the gear stage of the transmission based on information regarding the vehicle speed or the like detected by a vehicle speed sensor 7*c*. When the driving state of the vehicle 1 is an automated driving state, the ECU 26 automatically controls the power plant 6 in accordance with an instruction from the ECU 20, and controls the acceleration/deceleration of the vehicle 1.

The ECU 27 controls lighting devices (lights such as headlights and taillights) that include direction indicators 8 (blinkers). In the example in FIG. 1, direction indicators 8 are provided on door mirrors, at the front, and at the rear of the vehicle 1.

The ECU 28 controls an input/output apparatus 9. The input/output apparatus 9 outputs information to the driver, and receives information input by the driver. An audio output apparatus 91 notifies the driver of information using sound. A display apparatus 92 notifies the driver of information through image display. The display apparatus 92 is installed in front of the driver's seat, for example, and constitutes an instrument panel, or the like. Note that, here, sound and display are illustrated, but information may be notified using vibration and light. In addition, information may also be notified using a combination of some of sound, display, vibration, and light. Furthermore, the combination or a notification aspect may be different according to the level of information to be notified (for example, an emergency level). An input apparatus 93 is a group of switches that is disposed at a position where the driver can operate the switches and gives instructions to the vehicle 1, but a sound input apparatus may also be included.

The ECU 29 controls a brake apparatus 10 and a parking brake (not illustrated). The brake apparatus 10 is, for example, a disk brake apparatus, is provided for each of the wheels of the vehicle 1, and decelerates or stops the vehicle 1 by imposing resistance to rotation of the wheels. The ECU 29 controls activation of the brake apparatus 10, for example, in accordance with a driver's driving operation (brake operation) detected by an operation detection sensor 7*b* provided on a brake pedal 7B. When the driving state of the vehicle 1 is an automated driving state, the ECU 29 automatically controls the brake apparatus 10 in accordance with an instruction from the ECU 20, and controls deceleration and stop of the vehicle 1. The brake apparatus 10 and the parking brake can also be activated to maintain a stopped state of the vehicle 1. In addition, if the transmission of the power plant 6 includes a parking lock mechanism, this can also be activated in order to maintain a stopped state of the vehicle 1.

Figure 2:
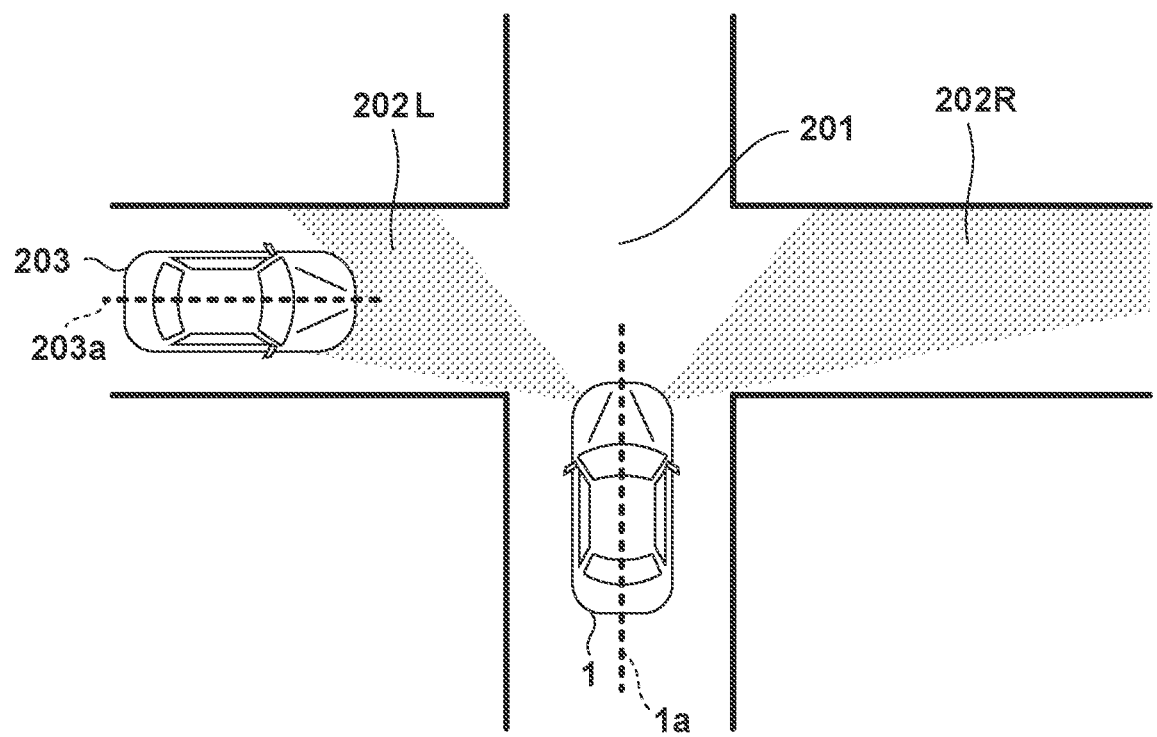
FIG. 2 is a schematic diagram illustrating a collision avoidance function according to an embodiment of the present disclosure.

A collision avoidance function that can be executed by the control apparatus 2 of the vehicle 1 will be described with reference to FIG. 2. Assume that, as shown in FIG. 2, the vehicle 1 is about to enter an intersection 201. The vehicle 1 can detect an object included in a detection region 202L, using the detection unit 43 (the radar 43) mounted on the front left side of the vehicle 1. Also, the vehicle 1 can detect an object included in the detection region 202R, using the detection unit 43 (the radar 43) on the front right side of the vehicle 1.

When it is detected that an object is included in the detection region 202L or 202R, the control apparatus 2 determines whether or not there is the possibility that this object will collide with the vehicle 1. For example, the control apparatus 2 may determine that there is the possibility that the detected object will collide with the vehicle 1 if the object moves in a direction intersecting a longer direction 1*a* of the vehicle 1. The control apparatus 2 may also determine the possibility of collision further based on the speed of the vehicle 1 and the speed of the object. The longer direction 1a of the vehicle 1 may also be referred to as the front-and-rear direction of the vehicle 1.

For example, assume that, in the example in FIG. 2, a vehicle 203 is also travelling toward the intersection 201. The control apparatus 2 of the vehicle 1 detects that the vehicle 203 is included in the detection region 202L. Since a longer direction 203a of the vehicle 203 intersects the longer direction 1a of the vehicle 1, the control apparatus 2 determines that there is the possibility that the vehicle 1 will collide with the vehicle 203.

If it is determined that there is the possibility that the vehicle 1 will collide with another object, the control apparatus 2 executes an operation for avoiding collision with the vehicle 203 (hereinafter, referred to as a "collision avoidance operation"). Specifically, the control apparatus 2 may alert the driver that there is the possibility of colliding with the vehicle 203, using the display apparatus 92, as the collision avoidance operation. Alternatively or in addition, the control apparatus 2 may decrease the speed of the vehicle 1 by causing the brake apparatus 10 to operate. When alerting the driver on the possibility of collision, the control apparatus 2 may also present, to the driver, the position of the detected object (for example, right or left) and the type of the detected object (for example, a vehicle, a person, a bicycle).

In the example in FIG. 2, the vehicle 203 is used as an example of an object that is to be avoided. Alternatively, an object that is to be avoided may be another object such as a person or a bicycle. In the example in FIG. 2, the object included in the detection region 202L is detected by the radar 43. Alternatively, the object included in the detection region 202L may also be detected using a LIDAR or a camera, or any combination of a LIDAR, a camera and a radar. The same apples to the detection region 202R A collision avoidance operation in a case where the vehicle 1 is about to be parked in a parking space will be described with reference to FIGS. 3A and 3B. Assume that the vehicle 1 is about to be parked in a parking space 301. Specifically, the vehicle 1 moves backward at a low speed toward the parking space 301, and moves forward as necessary for a multi-point turn. This operation may be performed through manual driving by the driver, or may also be performed by an automatic parking function of the vehicle 1.

An angle between the longer direction 1a of the vehicle 1 and a longer direction 301a of the parking space 301 is denoted by an angle 302. The longer direction 301a of the parking space 301 is a direction that matches the longer direction 1a of the vehicle 1 in the case where the vehicle 1 is parked in the parking space 301 by being moved in a straight line. If a demarcation line between the parking space 301 and adjacent parking space is present, the longer direction 301a of the parking space 301 may is parallel to this demarcation line.

Figure 3A:
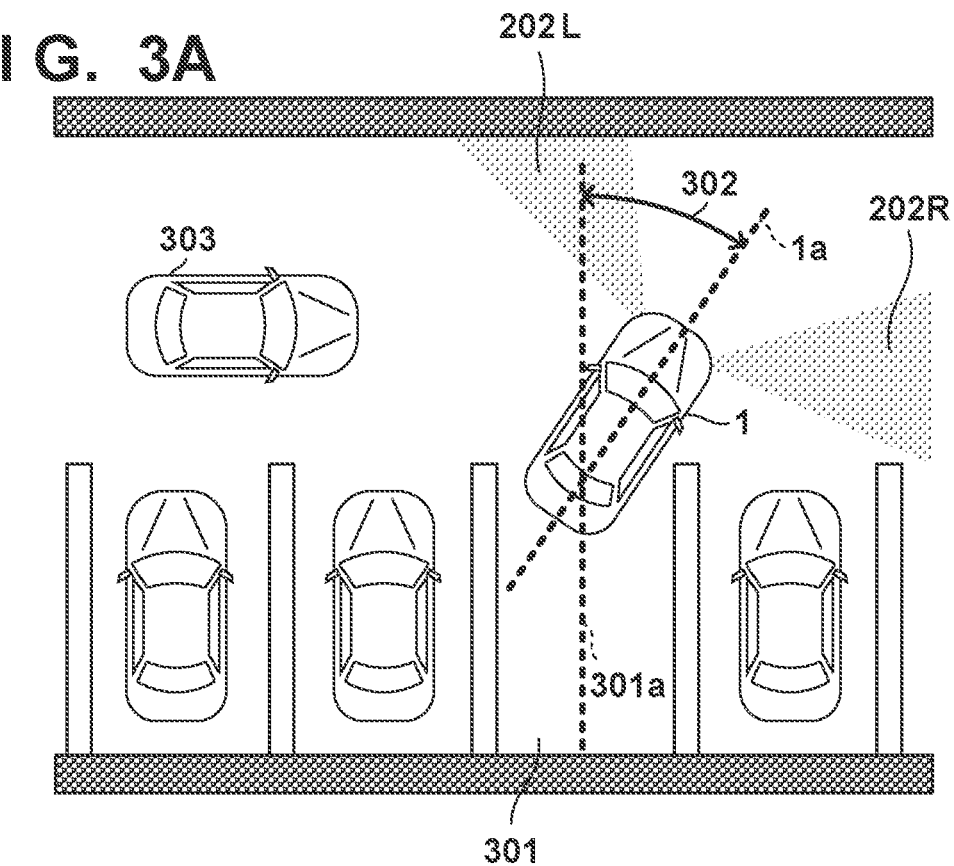
FIGS. 3A and 3B are diagrams illustrating an operation during parking according to an embodiment of the present disclosure.
Figure 3B:
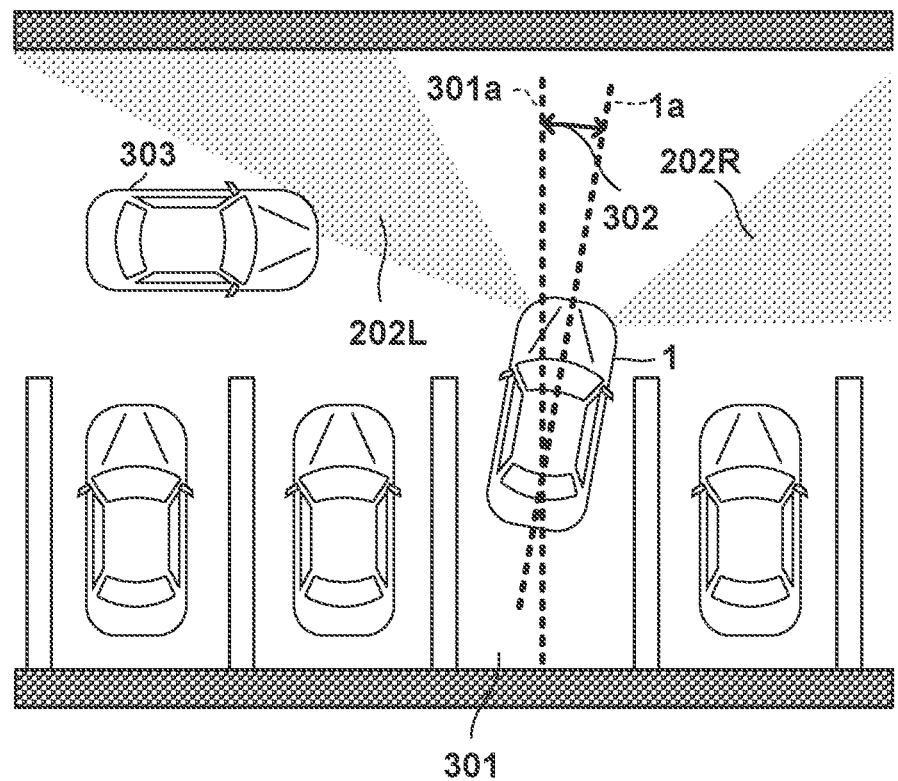

As shown in FIG. 3A, in the case where the angle 302 is large, even if there is a vehicle 303 approaching the vehicle 1, the vehicle 303 is not included in the detection region 202L nor 202R. Therefore, even if the control apparatus 2 executes the collision avoidance function, it is not possible to correctly determine the possibility of colliding with the vehicle 303. On the other hand, as shown in FIG. 3B, in the case where the angle 302 is small, the vehicle 303 is included in the detection region 202L, and thus the control apparatus 2 can correctly determine the possibility of colliding with the vehicle 303. In view of this, in some embodiments of the present disclosure, a switch is made between activation and inactivation of the collision avoidance function based on the magnitude of the angle 302. Accordingly, it is possible to reduce the occurrence of false detection in the collision avoidance function, and to reduce the computation load of the control apparatus 2. In the above-described example, a case has been described in which the longer direction 301a of the parking space 301 (for example, orthogonally) intersects a direction in which the other vehicle 303 proceeds, but the present disclosure is applicable even if these directions are parallel as in parallel parking.

Figure 4:
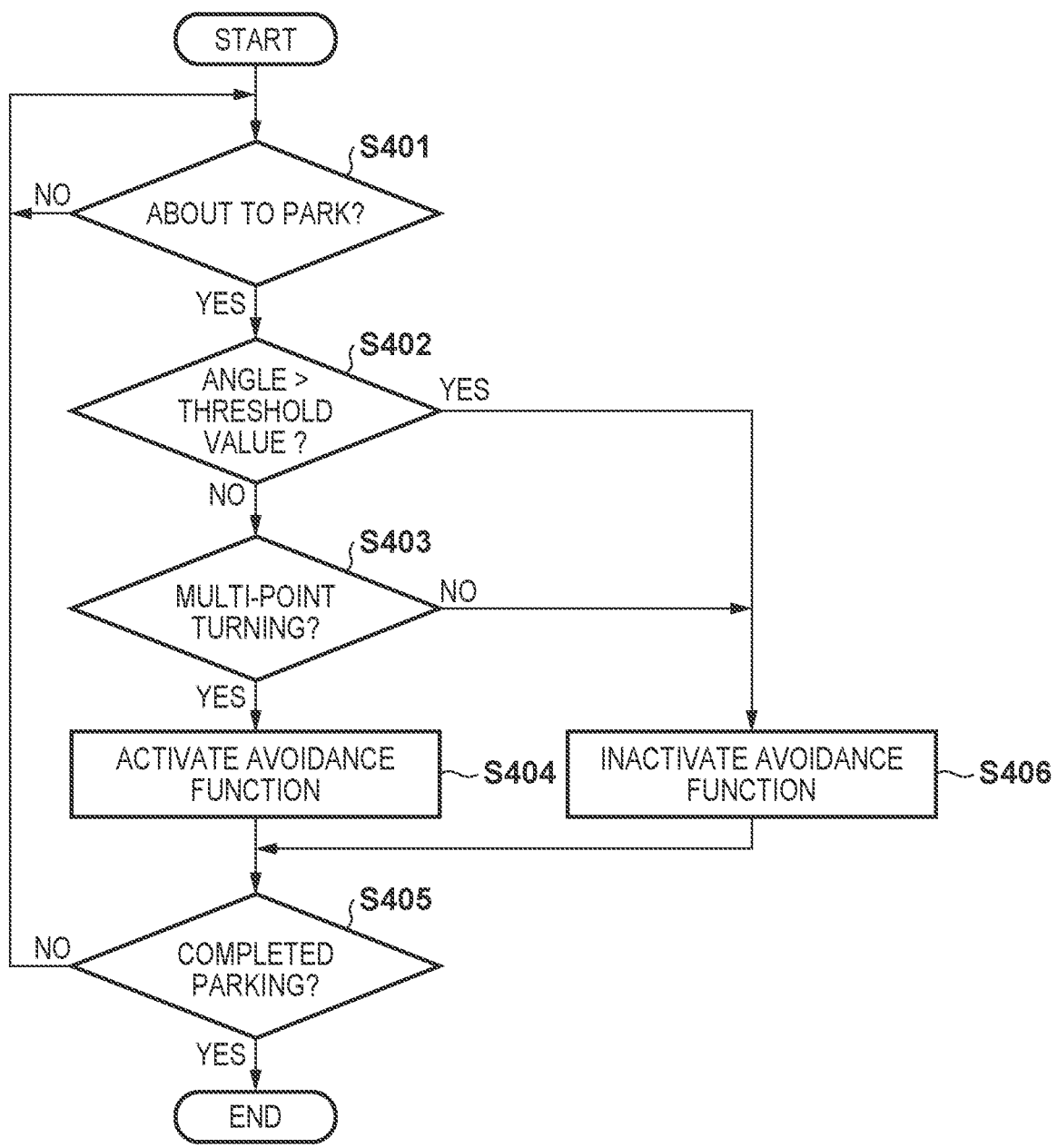
FIG. 4 is a flowchart illustrating a detailed control method according to an embodiment of the present disclosure.

Next, an example of a method in which the control apparatus 2 controls the vehicle 1 will be described with reference to FIG. 4. The method in FIG. 4 is processed, for example, as a result of the processor 20a of the ECU 20 executing an instruction of a program stored in the memory 20b of the ECU 20. Alternatively, a configuration may also be adopted in which dedicated hardware (for example, a circuit) execute the steps of the method. This method is started in accordance with the vehicle 1 starting moving.

In step S401, the control apparatus 2 determines whether or not the vehicle 1 is about to be parked in a parking space. If the vehicle 1 is about to be parked in a parking space (YES in step S401), the control apparatus 2 advances the procedure to step S402, and otherwise (NO in step S401) repeats step S401. In this manner, in step S401, the control apparatus 2 waits before starting an operation for parking the vehicle 1 in the parking space. The following steps S402 to S405 are executed while the vehicle 1 is about to be parked in parking space.

The control apparatus 2 may determine whether or not the vehicle 1 is about to be parked in a parking space, based on detection results of the detection units 41 to 43. Specifically, the control apparatus 2 may determine that the vehicle 1 is about to be parked in a parking space, based on a fact that there is a parking space in the vicinity of the vehicle 1 and the vehicle 1 have started to move (forward or backward) to approach the parking space. Alternatively, the control apparatus 2 may also determine that the vehicle 1 is about to be parked in a parking space, based on receiving, from the driver, an instruction to start the automatic parking function.

In step S402, the control apparatus 2 determines whether or not an angle between the longer direction 1a of the vehicle 1 and the longer direction of the parking space is larger than a threshold value. If the formed angle is larger than threshold value (YES in step S402), the control apparatus 2 advances the procedure to step S406, and otherwise (NO in step S402) advances the procedure to step S403. In this example, if the formed angle is equal to the threshold value, the procedure advances to step S403, but, instead, the procedure may advance to step S406. The threshold value that is used in step S402 may be determined based on the sizes of the detection region 202L and 202R, and be stored in the memory 20b in advance. The threshold value may be 20°, 30°, or 45°, for example.

In step S403, the control apparatus 2 determines whether or not the vehicle 1 is moving away from the parking space for a multi-point turn. If the vehicle 1 is moving away from the parking space (YES in step S403), the control apparatus 2 advances the procedure to step S404, and otherwise (NO in step S403) advances the procedure to step S406. When the vehicle 1 has temporarily stopped, the control apparatus 2 may advance the procedure to either step S404 or step S406.

It is conceivable that, when the vehicle 1 is moving to approach a parking space, the likelihood of the vehicle 1 colliding with an object approaching the vehicle 1 is low. On the other hand, when the vehicle 1 is moving away from a parking space, the likelihood of the vehicle 1 colliding with an object approaching the vehicle 1 increases. In particular, in the case where the angle between the longer direction 1a of the vehicle 1 and the longer direction of the parking space is smaller than the threshold value, and as shown in FIG. 3B, more than half of the vehicle 1 has entered the parking space 301, there is the possibility the vehicle 303 will travel to pass through in front of the vehicle 1. In view of this, in some embodiments, a switch is made between activation and inactivation of the collision avoidance function based on the direction in which the vehicle 1 proceeds. Note that, in other embodiments, step S403 may be omitted In step S404, the control apparatus 2 activates the collision avoidance function. In step S406, the control apparatus 2 inactivates the collision avoidance function. If the collision avoidance function is active, the control apparatus 2 executes processing for detecting an object on the front left and front right of the vehicle 1, as described with reference to FIG. 2, and the collision avoidance operation that is based on the likelihood of colliding with the detected object. If the collision avoidance function is inactive, the control apparatus 2 does not execute such an operation.

In step S405, the control apparatus 2 determines whether or not parking is complete. If parking is complete (YES in step S405), the control apparatus 2 ends the procedure, and otherwise (NO in step S405) advances the procedure to step S401. If the procedure returns to step S401, the control apparatus 2 determines whether or not the vehicle 1 is still about to be parked. If the vehicle 1 is no longer about to be parked, and is moving to another location, the control apparatus 2 repeats step S401.

Embodiment Overview

Item 1. A control apparatus (2) of a vehicle (1), the apparatus comprising:
  a parking determination unit configured to determine whether or not the vehicle is about to be parked in a parking space (301) (step S401); and
  a collision avoidance unit configured to be able to execute an avoidance function for avoiding collision with an object (203) that is moving in a direction (203a) intersecting a longer direction of the vehicle,
  wherein, while the vehicle is about to be parked in the parking space,
    in a case where an angle between the longer direction of the vehicle and a longer direction (301a) of the parking space is larger than a threshold value, the collision avoidance unit inactivates the avoidance function (steps S402 and S406), and
    in a case where the angle between the longer direction of the vehicle and the longer direction of the parking space is smaller than the threshold value, the collision avoidance unit activates the avoidance function (steps S402 and S404).

According to this embodiment, the collision avoidance function can be executed in appropriate cases. As a result, the processing load of the control apparatus reduces, and the occurrence of false detection can be reduced.

Item 2. The control apparatus according to Item 1,
  wherein, while the vehicle is about to be parked in the parking space and the angle between the longer direction of the vehicle and the longer direction of the parking space is smaller than the threshold value,
    in a case where the vehicle is moving to approach the parking space, the collision avoidance unit inactivates the avoidance function (steps S403 and S406), and
    in a case where the vehicle is moving away from the parking space for a multi-point turn, the collision avoidance unit activates the avoidance function (steps S403 and S404).

According to this embodiment, the collision avoidance function can be executed in more appropriate cases.

Item 3. The control apparatus according to Item 1 or 2,
  wherein the collision avoidance unit executes the avoidance function based on a detection result of a sensor (43) installed on a front lateral side of the vehicle.

According to this embodiment, the collision avoidance function can be executed in more appropriate cases.

Item 4. A vehicle (1) that includes the control apparatus (2) according to any one of Items 1 to 3.

According to this embodiment, a vehicle that has the above-described advantages is provided.

The invention is not limited to the foregoing embodiments, and various variations/changes are possible within the spirit of the invention.

What is claimed is:

1. A control apparatus of a vehicle, the apparatus comprising:
  at least one processor circuit with a memory comprising instructions, that when executed by the at least one processor circuit, causes the at least one processor circuit to at least:
  determine whether or not the vehicle is to be parked in a parking space; and
  provide an avoidance function for avoiding collision with an object that is moving in a direction intersecting a front-and-rear direction of the vehicle; and
  alert a driver of the vehicle using a display apparatus or decrease a speed of the vehicle by causing a brake apparatus of the vehicle to operate in a case where the avoidance function is active and it is determined that there is a possibility that the vehicle will collide with the object,
  wherein, while the vehicle is to be parked in the parking space,
    in a case where an angle between the front-and-rear direction of the vehicle and a longer direction of the parking space is larger than a threshold value, the avoidance function is inactivated, the longer direction of the parking space being a direction that matches the front-and-rear direction of the vehicle in a case where the vehicle is parked in the parking space by being moved in a straight line, and
    in a case where the angle between the front-and-rear direction of the vehicle and the longer direction of the parking space is smaller than the threshold value, the avoidance function is activated.

2. The control apparatus according to claim 1,
  wherein, while the vehicle is about to be parked in the parking space and the angle between the front-and-rear direction of the vehicle and the longer direction of the parking space is smaller than the threshold value,
    in a case where the vehicle is moving to approach the parking space, the avoidance function is inactivated, and
    in a case where the vehicle is moving away from the parking space for a multi-point turn, the avoidance function is activated.

3. The control apparatus according to claim 1, wherein the avoidance function is executed based on a detection result of a sensor installed on a front corner of the vehicle.

4. A vehicle that includes the control apparatus according to claim 1.

* * * * *